(12) United States Patent
Watanabe et al.

(10) Patent No.: US 9,994,224 B2
(45) Date of Patent: Jun. 12, 2018

(54) SHIFT CONTROL SYSTEM FOR AUTOMATIC TRANSMISSION

(71) Applicant: Toyota Jidosha Kabushiki Kaisha, Toyota-shi (JP)

(72) Inventors: Hideo Watanabe, Toyota (JP); Naoto Moriya, Toyota (JP); Kuninori Kumagai, Susono (JP); Junya Mizuno, Suntou-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/337,284

(22) Filed: Oct. 28, 2016

(65) Prior Publication Data
US 2017/0144667 A1 May 25, 2017

(30) Foreign Application Priority Data
Nov. 19, 2015 (JP) .................. 2015-226288

(51) Int. Cl.
*F16H 61/04* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 4,792,902 A * 12/1988 Hrovat .................. F02P 5/1455
                                                        192/3.28
7,086,989 B2 * 8/2006 Siebigteroth ......... F16H 61/061
                                                          477/109
(Continued)

FOREIGN PATENT DOCUMENTS

| JP | 2001-124196 | 5/2001 |
| JP | 2007-239832 | 9/2007 |
| JP | 2010-115983 | 5/2010 |

*Primary Examiner* — Justin Holmes
(74) *Attorney, Agent, or Firm* — Oblon, McClelland, Maier & Neustadt, L.L.P.

(57) ABSTRACT

A shift control system that reduces drop in driving force and shocks during execution of clutch-to-clutch upshifting is provided. The control system is configured to reduce a torque transmitting capacity of a first clutch at a predetermined rate while increasing a torque transmitting capacity of a second clutch with a reduction in the torque transmitting capacity of the first clutch during execution of the upshifting, to set a target speed of the engine to a level determined by adding a predetermined speed to a synchronous engine speed corresponding to a low speed stage, during a torque phase in which the torque transmitting capacity of the first clutch is being reduced and the torque transmitting capacity of the second clutch is being increased, and to execute a feedback control of an engine torque in such a manner as to maintain the engine speed to the target speed based on a difference between the target speed and an actual engine speed.

2 Claims, 3 Drawing Sheets (51) Int. Cl.
*B60W 10/02* (2006.01)
*B60W 10/06* (2006.01)

(52) U.S. Cl.
CPC ..... *F16H 61/04* (2013.01); *B60W 2510/0275* (2013.01); *B60W 2510/0638* (2013.01); *B60W 2510/0657* (2013.01); *B60W 2510/102* (2013.01); *B60W 2710/027* (2013.01); *B60W 2710/0644* (2013.01); *B60W 2710/0666* (2013.01); *B60W 2710/105* (2013.01)

(56) References Cited

U.S. PATENT DOCUMENTS

| | | | |
|---|---|---|---|
| 8,079,936 B2* | 12/2011 | MacFarlane | F16D 48/06 477/107 |
| 9,162,680 B1* | 10/2015 | Tseng | B60W 30/19 |
| 2006/0135316 A1* | 6/2006 | Fujii | F16H 61/061 477/156 |
| 2011/0118915 A1* | 5/2011 | Ortmann | B60K 6/48 701/22 |
| 2011/0307150 A1* | 12/2011 | Jiang | B60W 10/113 701/54 |
| 2012/0232732 A1* | 9/2012 | Tsuda | B60K 6/48 701/22 |
| 2015/0024905 A1* | 1/2015 | Dunfee, II | B60W 10/113 477/77 |
| 2015/0126329 A1* | 5/2015 | Johri | B60W 10/08 477/5 |

* cited by examiner

SHIFT CONTROL SYSTEM FOR AUTOMATIC TRANSMISSION

CROSS REFERENCE TO RELATED APPLICATIONS

The present application claims the benefit of priority to Japanese Patent Application No. 2015-226288 filed on Nov. 19, 2015 with the Japanese Patent Office, the entire contents of which are incorporated herein by reference in its entirety.

BACKGROUND

Field of the Disclosure

Embodiments of the present application relate to the art of a shift control system for an automatic vehicle transmission configured to change a speed ratio stepwise.

Discussion of the Related Art

When the vehicle is accelerated, upshifting is executed to reduce a speed ratio as a result of an increase in a vehicle speed. In this case, a speed of a prime mover such as an engine is reduced while increasing an output of the engine and hence a driving force is changed significantly by the upshifting. Especially, given that the upshifting is executed by a clutch-to-clutch shifting, the drive force would be changed significantly to generate a shock as a result of disengaging a clutch engaged to establish the previous gear stage and engaging another clutch to establish the higher gear stage. JP-A-2010-115983 describes a controller for vehicle powertrain configured to compensate for torque drop by a motor or an engine during a torque phase in the clutch-to-clutch shifting. To this end, according to the teachings of JP-A-2010-115983, a torque compensating rate is determined based on a result of experimentation, and a timing of execution of the torque compensation is learnt. Specifically, if the learning of the timing is not progressed, the torque compensating rate is reduced.

JP-A-2007-239832 describes a controller for an automobile having a feedback means that controls a torque transmitting capacity of a clutch involved in a shifting operation of a transmission based on a difference between a target speed and an actual engine speed. In addition, JP-A-2001-124196 describes a shift control device of automobile configured to correct an engine torque during execution of a power-on downshifting. According to the teachings of JP-A-2001-124196, the control device calculates excess and deficiency of energy based on a difference between a target value and an actual value of an input speed during execution of the power-on downshifting, and corrects the engine torque in accordance with the calculated excess or deficiency of energy.

According to the teachings of JP-A-2010-115983, the torque compensating rate is determined based on a result of experimentation. However, given that an internal combustion engine is used as a prime mover, an output torque of the engine is varied inevitably. In addition, a torque transmitting capacity of a friction clutch is also varied inevitably. For these reasons, if the torque compensating rate is set to a constant value determined based on a result of experimentation, the torque may not be controlled accurately taking account of variations in the engine torque and the torque transmitting capacity of the clutch, and hence a drop in the drive force and a resultant shock may not be reduced sufficiently. In addition, the controller taught by JP-A-2010-115983 is configured to reduce the torque compensating rate before learning the timing of torque compensation sufficiently. However, although the past data can be reflected on such learning control, the current situation cannot be reflected on the learning control. In addition, such reduction in the torque compensating rate may not be always effective before learning the timing of torque compensation sufficiently. For this reason, the conventional learning control of the timing of torque compensation may be improved to reduce drop in driving force and shocks.

The torque compensation by the engine torque taught by JP-A-2010-115983 may be effective to reduce drop in drive force and shocks during execution of the clutch-to-clutch shifting. However, the controller taught by JP-A-2007-239832 thus configured to adjust the engine speed to the target speed by the feedback method cannot be used to reduce drop in drive force and shocks during execution of the clutch-to-clutch shifting. Meanwhile, the shift control device taught by JP-A-2001-124196 is configured to control engine torque during execution of the power-on downshifting and hence the shift control device taught by JP-A-2001-124196 cannot be used to control the engine torque during execution of upshifting. In addition, according to the teachings of JP-A-2001-124196, deficiency and shortage of energy during execution of the shifting operation is corrected by the engine torque. According to the teachings of JP-A-2001-124196, therefore, the input speed may be adjusted to the target speed, but drop in drive force and shocks in the torque phase during execution of upshifting may not be reduced.

SUMMARY

Aspects of the present application have been conceived noting the foregoing technical problems, and it is therefore an object of the present application is to provide a shift control system that reduces drop in driving force and shocks during execution of clutch-to-clutch upshifting.

The shift control system is applied to an automatic vehicular transmission that has a first frictional engagement device to be engaged to establish a predetermined low speed stage and a second frictional engagement device to be engaged to establish a predetermined high speed stage. The transmission is connected to an output side of an engine, and adapted to carry out an upshifting by disengaging the first frictional engagement device while engaging the second frictional engagement device during generation of torque by the engine. In order to achieve the above-explained objective, the shift control system is provided with a controller that controls the first frictional engagement device, the second frictional engagement device and the engine. According to an embodiment of the present application, the controller is configured to: reduce a torque transmitting capacity of the first frictional engagement device at a predetermined rate while increasing a torque transmitting capacity of the second frictional engagement device with a reduction in the torque transmitting capacity of the first frictional engagement device, during execution of the upshifting; set a target speed of the engine to a level determined by adding a predetermined speed to a synchronous engine speed corresponding to the low speed stage, during a torque phase in which the torque transmitting capacity of the first frictional engagement device is being reduced and the torque transmitting capacity of the second frictional engagement device is being increased; and execute a feedback control of an engine torque in such a manner as to maintain the engine speed to the target speed based on a difference between the target speed and an actual engine speed.

In a non-limiting embodiment, the controller may be further configured to calculate the engine torque and the torque transmitting capacity of the second frictional engagement device using equations of motion with respect to a gear train of the transmission while keeping the output shaft torque of the transmission to a constant value and setting the change rate of the input speed to the transmission to a value before execution of the upshifting. Specifically, the equations include: an equation of motion determining a relation among an output shaft torque of the transmission, an input torque to the transmission, the torque transmitting capacity of the first frictional engagement device and the torque transmitting capacity of the second frictional engagement device; and an equation of motion determining a relation among a change rate of an input speed to the transmission, the input torque to the transmission, the torque transmitting capacity of the first frictional engagement device and the torque transmitting capacity of the second frictional engagement device. In addition, the feedback control may include a correction of the torque calculated using the equations of motion.

In a non-limiting embodiment, the controller may be further configured to maintain the engine torque to the current value and to increase the torque transmitting capacity of the second frictional engagement device at the same rate as the previous increasing rate, when the torque transmitting capacity of the first frictional engagement device is reduced to be lower than a predetermined level to be disengaged.

Thus, according to the embodiment of the present application, the feedback control of the engine torque is executed in such a manner as to maintain the engine speed to the target speed to a level higher than the synchronous engine speed corresponding to the low speed stage, during the torque phase in the upshifting. If the engine torque and the torque transmitting capacities of the frictional engagement devices are fluctuated, the engine speed is also fluctuated. However, the shift control system according to the embodiment is configured to maintain the engine speed to the level higher than the synchronous engine speed corresponding to the low speed stage during the torque phase in the upshifting. According to the embodiment, therefore, the engine speed can be prevented from falling below the synchronous speed even if the engine torque and the torque transmitting capacities of the frictional engagement devices are fluctuated. In addition, since the engine speed is maintained to the target speed by controlling the engine torque by the feedback method, the engine torque may be increased to the level higher than the level to maintain the engine speed to the synchronous speed. For this reason, drop in the drive torque can be prevented during the torque phase in the upshifting even if the engine torque and the torque transmitting capacities of the frictional engagement devices are fluctuated.

As described, the controller is further configured to calculate the engine torque and the torque transmitting capacity of the second frictional engagement device using equations of motion, and to correct the calculated engine torque by the feedback method based on the difference between the target speed and an actual engine speed. According to the embodiment, therefore, drop in the drive torque can be prevented certainly during the torque phase.

As also described, the controller is further configured to maintain the engine torque to the current value and to increase the torque transmitting capacity of the second frictional engagement device at the same rate as the previous increasing rate when the first frictional engagement device is disengaged. According to the embodiment, therefore, abrupt rise in the engine speed and drop in the drive torque can be prevented if the torque transmitting capacity of the second frictional engagement devices is fluctuated.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
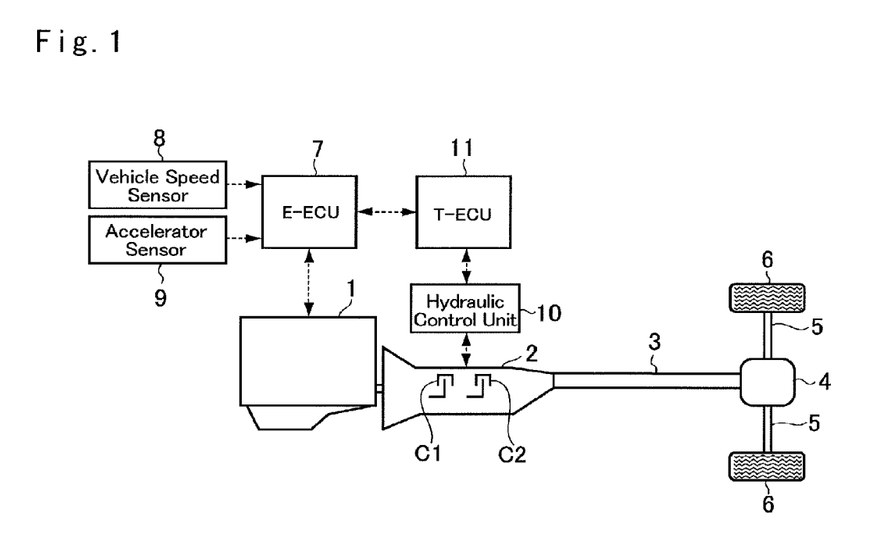
FIG. 1 is a schematic illustration showing one example of a powertrain of the vehicle to which the control system according to the embodiment is applied.

Preferred embodiment of the present application will now be explained with reference to the accompanying drawings. Referring now to FIG. 1, there is shown one example of a powertrain of a vehicle to which the control system according to the preferred embodiment is applied. In the powertrain shown in FIG. 1, an automatic transmission (as will be simply called the "transmission" hereinafter) 2 is connected to an output side of an engine 1. The transmission 2 is adapted to establish a plurality of gear stages of different speed ratios by manipulating engagement devices such as clutches and brakes (as will be simply called the "clutch" hereinafter). For example, a frictional engagement device actuated hydraulically may be used as the clutch, and hence a torque transmitting capacity of the clutch is changed according to a hydraulic pressure applied thereto. Specifically, the transmission 2 comprises a first clutch C1 that is engaged to establish a predetermined low stage, and a second clutch C2 that is engaged to establish a predetermined higher stage. One end of a propeller shaft 3 is connected to an output side of the transmission 2, and other end of the propeller shaft 3 is connected to a differential gear unit 4 as a final reduction. Thus, a drive force (or a drive torque) generated by the engine 1 is delivered to the differential gear unit 4 through the transmission 2, and further delivered to drive wheels 6 through each drive shafts 5.

A fuel injection, an ignition timing, and a number of cylinders to be operated may be controlled electrically by a first electronic control unit (abbreviated as the "E-ECU" hereinafter) 7 for the engine 1. The E-ECU 7 is composed mainly of a microcomputer that is configured to carry out a calculation based on incident data and preinstalled data, and to transmit a calculation result in the form of command signal to the engine 1. To this end, a vehicle speed sensor 8, an accelerator sensor 9, an engine speed sensor (not shown) etc. are connected to the E-ECU 7 to send data about a vehicle speed, an opening degree of an accelerator and an engine speed etc. to the E-ECU 7.

The transmission 2 further comprises a geared transmission mechanism in which a gear stage thereof is shifted by engaging and disengaging the clutches C1 and C2, and a torque converter (not shown) arranged on an input side of the geared transmission mechanism. For example, a conventional geared transmission described in JP-A-2010-

115983 and a conventional torque converter having a lockup clutch may be used in the transmission 2. In order to hydraulically control the lockup clutch and the above-mentioned clutches C1 and C2, the powertrain is provided with a hydraulic control unit 10. Specifically, the hydraulic control unit 10 is configured to regulate a line pressure by electrically controlling valves (not shown), and to control an engagement pressure of the lockup clutch and torque transmitting capacities of the first clutch C1 and the second clutch C2 by controlling oil pressures applied to those elements.

The transmission 2 is controlled by a second electronic control unit (abbreviated as the "T-ECU" hereinafter) 11 through the hydraulic control unit 10. The T-ECU 11 is also composed mainly of a microcomputer that is configured to carry out a calculation based on incident data about a vehicle speed and an opening degree of the accelerator and preinstalled data such as a shifting diagram, and to transmit a calculation result in the form of command signal to the hydraulic control unit 10. In addition, the T-ECU 11 is also connected to the E-ECU 7 to exchange data therebetween. Specifically, an upshifting of the transmission 2 is executed when a shift point determined based on a vehicle speed and an opening degree of the accelerator is changed upwardly across the upshift line of the shifting diagram. Likewise, a downshifting of the transmission 2 is executed when the shift point is changed downwardly across the downshift line of the shifting diagram. Accordingly, the above-mentioned E-ECU 7 and the T-ECU 11 serve as the controller of the shift control system.

For example, a condition of executing an upshifting is satisfied when a vehicle speed is increased, and according to the embodiment, such upshifting may be executed by the clutch-to-clutch shifting by disengaging the first clutch C1 while disengaging the second clutch C2. In this case, the shift control system according to the embodiment executes the following controls shown in FIG. 2. First of all, satisfaction of the condition of executing the upshifting is determined at step S1. Specifically, such determination at step S1 may be made based on a fact that the shift point is changed upwardly across the upshift line of the shifting diagram, or based on a transmission of a shift command transmitted in response to a change in a running condition of the vehicle.

Figure 2:
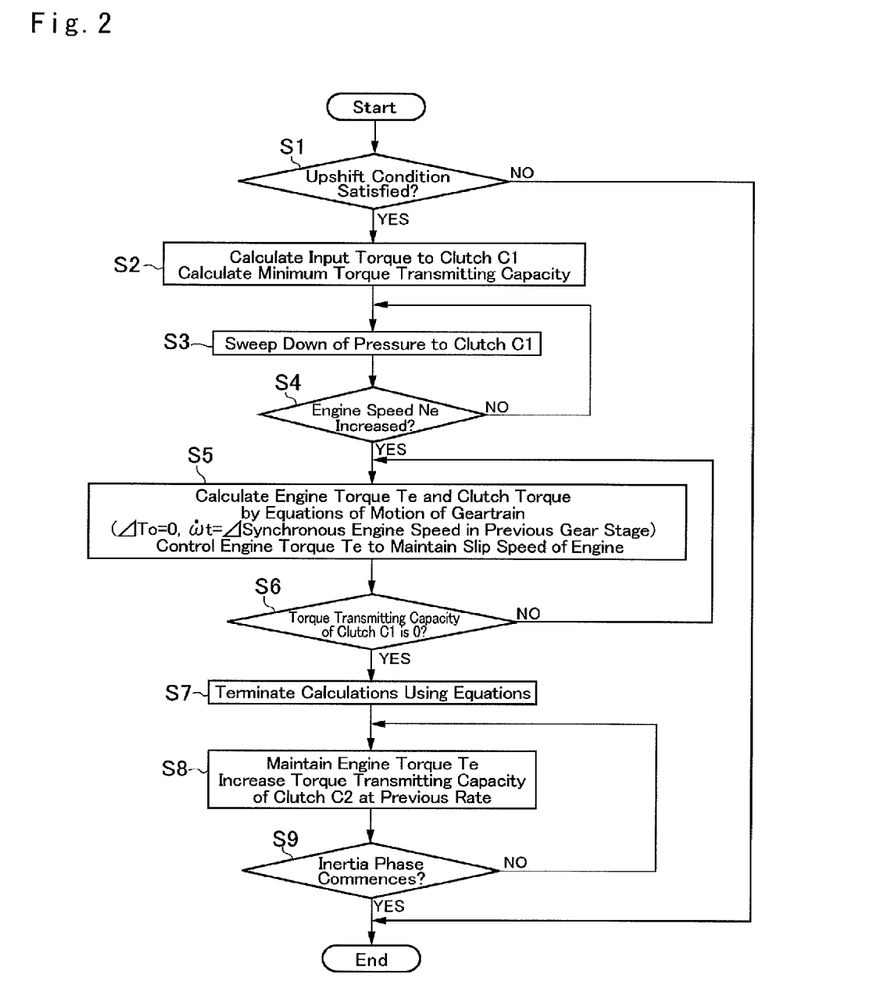
FIG. 2 is a flowchart showing one example of the shifting control according to the embodiment.

If the answer of step S1 is NO, the routine is returned without carrying out any specific control. By contrast, if the answer of step S1 is YES, the routine progresses to step S2 to calculate a torque applied to the first clutch C1 to be disengaged, and a minimum torque transmitting capacity of the first clutch C1 possible to transmit a torque required by the driver. Such input torque of the first clutch C1 can be calculated based on an output torque of the engine 1 and a gear ratio between the first clutch C1 and the engine 1 in the geared transmission mechanism. Specifically, the output torque of the engine 1 is governed by an air intake and a fuel injection, and the gear ratio between the first clutch C1 and the engine 1 can be calculated based on a ratio between an output speed of the engine 1 and an input speed of the first clutch C1. On the other hand, the minimum torque transmitting capacity of the first clutch C1 is calculated in such a manner as to transmit the torque required by the driver without causing slippage. To this end, the torque required by the driver is calculated based on a vehicle speed and an opening degree of the accelerator with reference to a preinstalled map.

During propulsion of the vehicle without carrying out a shifting operation of the transmission 2, a hydraulic pressure close to the line pressure is applied to the first clutch C1, and in this situation, a torque transmitting capacity of the first clutch C1 is larger than that required to transmit the torque required by the driver. After thus calculating the minimum torque transmitting capacity of the first clutch C1 at step S2, the hydraulic pressure applied to the first clutch C1 is lowered to a level to reduce the torque transmitting capacity of the first clutch C1 to the calculated minimum torque transmitting capacity for the preparation of upshifting. Then, the routine progresses to step S3 to execute a sweep down of the hydraulic pressure applied to the first clutch C1 from the level of maintaining the torque transmitting capacity of the first clutch C1 to the minimum torque transmitting capacity. To this end, a reduction rate of the hydraulic pressure is determined in such a manner as to prevent delay in the upshifting and overshooting of the first clutch C1. Meanwhile, the hydraulic pressure applied to the second clutch C2 to be engaged is increased gradually.

Then, the routine progresses to step S4 to determine whether or not an engine speed Ne is increased from a synchronous engine speed corresponding to the previous lower gear stage that is calculated based on a speed ratio of the previous gear stage and a vehicle speed (i.e., a speed of the propeller shaft 3). Specifically, such determination at step S4 is made based on a fact that the engine speed Ne is raised several tens rpm higher than the synchronous engine speed corresponding to the previous lower gear stage.

As described, at step S3, the hydraulic pressure applied to the first clutch C1 is reduced gradually from the level of maintaining the torque transmitting capacity of the first clutch C1 to the minimum torque transmitting capacity possible to transmit the required torque without causing slippage. Therefore, the first clutch C1 starts slipping immediately at step S3 by thus reducing the hydraulic pressure applied thereto, and consequently the engine speed Ne is raised. That is, such sweep down of the hydraulic pressure applied to the first clutch C1 is continued as long as the answer of step S3 is NO. When the engine speed Ne is raised to a desired speed so that the answer of step S4 is YES, the routine progresses to step S5 to calculate an engine torque Te and a torque transmitting capacity of the second clutch C2 using equations of motion with respect to the gear train of the transmission 2. At the same time, a feedback control of the engine torque Te is executed in such a manner as to maintain the engine speed Ne to the level higher than the synchronous engine speed corresponding to the previous lower gear stage. Specifically, the engine torque Te and the torque transmitting capacity of the second clutch C2 are calculated using the following equations:

$$T_o = A \sim T_t - B \cdot T_{C1} + C \cdot T_{C2}; \text{ and}$$

$$d\omega_t/dt = D \cdot T_t + E \cdot T_{C1} - F \cdot T_{C2},$$

where $T_o$ is an output shaft torque (i.e., a torque outputted from the transmission 2), and $T_t$ is a turbine torque of the torque converter of the transmission 2 corresponding to an input torque. Specifically, when a lockup clutch of the torque converter is in engagement, the turbine torque $T_t$ corresponds to the engine torque Te. By contrast, when the lockup clutch of the torque converter is in disengagement, the turbine torque $T_t$ is calculated by multiplying the engine torque Te by a speed ratio of the torque converter. In addition, in the above equations, $T_{C1}$ is a torque transmitting capacity of the first clutch C, $T_{C2}$ is a torque transmitting capacity of the second clutch C2, $\omega_t$ is a rotational speed of the turbine, and A to F are constants determined based on results of experimentations.

In order to calculate the engine torque Te and the torque transmitting capacity $T_o$ of the second clutch C2, the output shaft torque $T_o$ is set to a constant value. That is, an amount of change in the output shaft torque $\Delta T_o$ is maintained to zero ($\Delta T_o=0$). To this end, specifically, the output shaft torque $T_o$ is kept to the torque when the condition to carry out the upshifting is satisfied. On the other hand, a change rate $d\omega_t/dt$ of the turbine speed $\omega_t$ is set to a change rate of the synchronous engine speed corresponding to the previous lower gear stage at the point when the condition to carry out the upshifting is satisfied (i.e., a change rate $\Delta$ of the synchronous engine speed before execution of the upshifting). In addition, a value of the torque transmitting capacity $T_{C1}$ of the first clutch C1 is reduced with a progression of the sweep down carried out at step S3. Consequently, the engine torque Te and the torque transmitting capacity $T_{C2}$ of the second clutch C2 are obtained by thus using the above equations.

At step S5, specifically, the engine speed Ne is maintained to a level determined by adding an increase in the rotational speed of the engine 1 resulting from slippage of the first clutch C1 (i.e., a slip speed) to the synchronous engine speed corresponding to the previous lower gear stage. To this end, the engine torque Te is corrected by the feedback method in such a manner as to maintain the slip speed to a constant value based on a difference between a designed value of the slip speed and a detected value of an actual rotational speed of the engine 1. An output torque of the engine 1 is changed depending on an air intake, a fuel injection, an ignition timing etc. and hence the engine torque Te may be corrected by changing an opening degree of the accelerator or an ignition timing. Thus, the shift control system according to the embodiment carries out the feedback control of the engine torque Te obtained using the above-explained equation based on a deviation between the designed value of the slip speed and the detected value of the actual rotational speed of the engine 1. Alternatively, the engine torque Te at a commencement of the upshifting, or a predetermined engine torque value may also be corrected by the above-explained feedback method.

Then, the routine progresses to step S6 to determine whether or not the torque transmitting capacity $T_{C1}$ of the first clutch C1 is reduced to zero during execution of the feedback control of the engine torque Te. Such determination at step S6 may be made based on a fact that the hydraulic pressure applied to the first clutch C1 or a hydraulic command thereof is reduced to a predetermined value close to zero. If the torque transmitting capacity $T_{C1}$ of the first clutch C1 has not yet been reduced to zero so that the answer of step S6 is NO, the routine is returned to step S5 to repeat the above-explained controls.

By contrast, if the answer of step S6 is YES, the routine progresses to step S7 to terminate the calculations of the engine torque Te and the torque transmitting capacity $T_{C2}$ of the second clutch C2 using the above-explained equations. At the same time, or subsequently, the routine progresses to step S8 to maintain the engine torque Te to the current value and to increase the torque transmitting capacity $T_{C2}$ of the second clutch C2 or the hydraulic pressure applied thereto at the same rate as the previous increasing rate. During execution of the controls at step S8, a commencement of the inertia phase is determined at step S9. Specifically, the inertia phase is a period of time in which rotary members of the powertrain including the engine 1 and the transmission 2 are increased toward a synchronous engine speed corresponding to the higher gear stage to be established by the upshifting. For example, the commencement of the inertia phase may be determined based on a fact that: the engine speed Ne is reduced to a predetermined level from the synchronous engine speed corresponding to the previous lower gear stage; the torque transmitting capacity $T_{C1}$ of the first clutch C1 or the hydraulic pressure applied thereto is reduced to a predetermined level; or the engine torque Te is changed by the controls at step S8.

If the inertia phase has not yet commenced so that the answer of step S9 is NO, the routine is returned to step S8 to repeat the controls at step S8. By contrast, if the inertia phase has commenced so that the answer of step S9 is YES, the routine shown in FIG. 2 is terminated.

Figure 3:
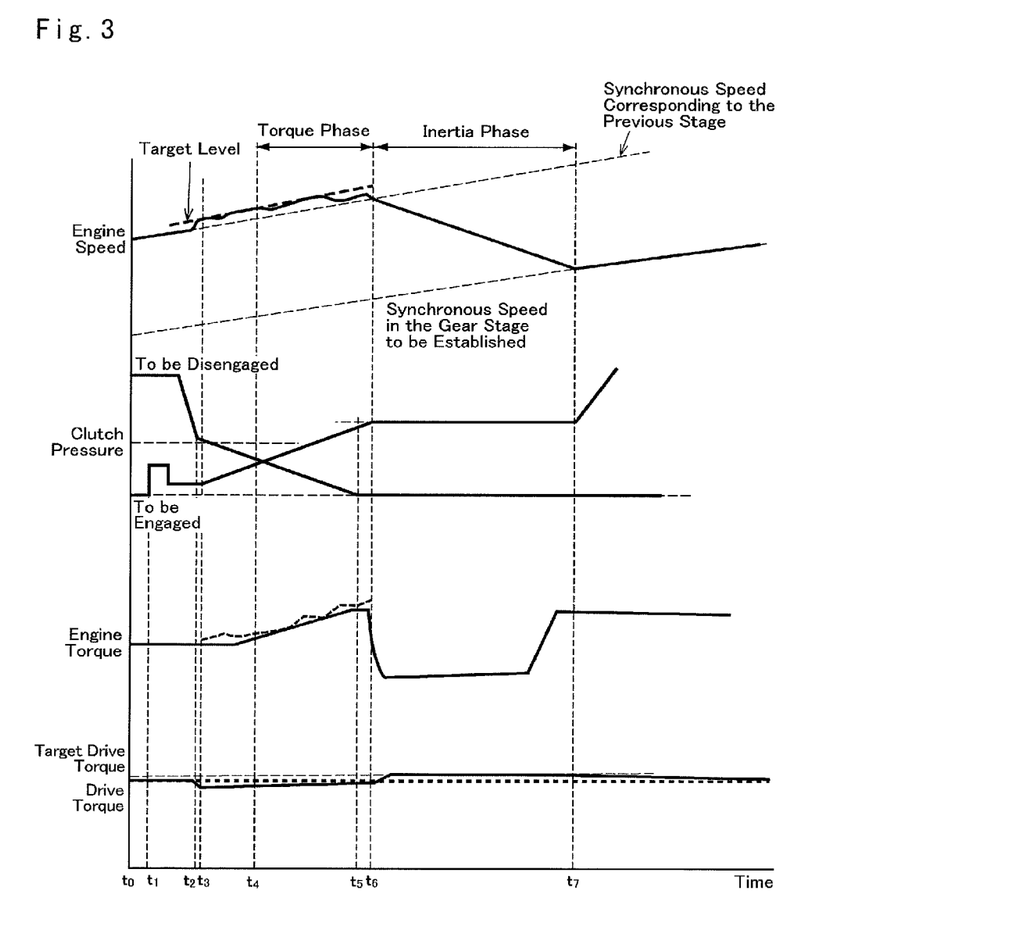
FIG. 3 is a time chart indicating temporal changes in an engine speed, a pressure applied to the clutch, an engine torque, a drive torque during execution of the routine shown in FIG. 2.

Turning to FIG. 3, there are shown temporal changes in the engine speed Ne, hydraulic pressures applied to the first clutch C1 and the second clutch C2 (or command values thereof), the engine torque Te, and the drive torque. In the example shown in FIG. 3, the execution condition of the upshifting is satisfied at point t0. In this situation, a high pressure is applied to the first clutch C1 to engage the first clutch C1, and a hydraulic pressure is not applied to the second clutch C2 to disengage the second clutch C2. Then, at point t1, a first fill of the second clutch C2 is executed to reduce a clearance (i.e., a pack clearance) of the second clutch C2 by temporality raising the hydraulic pressure applied thereto.

After carrying out the first fill of the second clutch C2, at point t2, the hydraulic pressure applied to the second clutch C2 is kept to a predetermined low level at which the pack clearance will not be widened. Meanwhile, the hydraulic pressure applied to the first clutch C1 is reduced to the level at which the torque transmitting capacity of the first clutch C1 is reduced to the minimum torque transmitting capacity possible to transmit a required torque. Then, the sweep down of the hydraulic pressure applied to the first clutch C1 is executed at point t3 to gradually reduce the torque transmitting capacity $T_{C1}$ of the first clutch C1. Consequently, the first clutch C1 starts slipping and hence the engine speed Ne is increased from the synchronous engine speed corresponding to the previous low stage. In this situation, the controller determines a fact that the engine speed Ne is increased and hence the routine shown in FIG. 2 progresses from step S4 to step S5 to calculate the torque transmitting capacity of the second clutch C2. Then, the hydraulic pressure to achieve the calculated torque transmitting capacity is applied to the second clutch C2, and consequently the torque transmitting capacity of the second clutch C2 is increased gradually.

At the same time, a target level of the engine speed Ne is determined by adding the increase in the engine speed Ne resulting from slippage of the first clutch C1 to the synchronous engine speed corresponding to the previous lower gear stage, and the feedback control of the engine torque Te is executed in such a manner as to maintain the engine speed Ne to the target level. To this end, specifically, the target level of the engine speed Ne is determined in such a manner as to prevent the driver from sensing such increase in the engine speed Ne. In this situation, as indicated by the dashed curve in FIG. 3, the engine torque Te is increased from the torque calculated using the above-mentioned equations of motion indicated by the solid line, by adjusting an opening degree of the throttle valve and an ignition timing of the engine 1.

Meanwhile, the hydraulic pressure applied to the second clutch C2 is further increased gradually with a reduction in the hydraulic pressure applied to the first clutch C1. That is, the torque transmitting capacity of the second clutch C2 is increased gradually with a reduction in the torque transmitting capacity of the first clutch C1. Consequently, at point t4, torque changes occur on the first clutch C1 and the second clutch C2, and hence a torque phase commences. Then, the second clutch C2 starts transmitting larger torque than the first clutch C1. Thus, the clutch to transmit the torque is changed from the first clutch C1 to the second clutch C2 by the clutch-to-clutch method.

During execution of the clutch-to-clutch upshifting, the drive torque may be dropped by fluctuations in the clutch torque and the engine torque. In order to prevent such disadvantage, the shift control system according to the embodiment executes the feedback control of the engine torque Te to maintain the engine speed Ne to the target level that is higher than the synchronous engine speed corresponding to the previous lower gear stage. According to the embodiment, therefore, the fluctuations in the clutch torque and the engine torque Te can be suppressed to prevent drop in the drive torque. That is, since the engine torque Te is increased from the level at which the engine speed Ne is maintained to the synchronous engine speed corresponding to the previous lower gear stage, the engine torque Te can be prevented from dropping significantly even if it is fluctuated. In addition, an internal lock of the transmission 2 is caused to drop an output shaft torque of the transmission 2 if the torque transmitting capacities of both of the first clutch C1 and the second clutch C2 are increased, that is, if a tie-up condition of the clutches is caused by a fluctuation in the clutch torques. According to the embodiment, however, such drop in the output shaft torque of the transmission 2 (i.e., the drive torque) may also be prevented by thus keeping the engine torque Te higher than the level at which the engine speed Ne is maintained to the synchronous engine speed corresponding to the previous lower gear stage. By contrast, if the torque transmitting capacities of both of the first clutch C1 and the second clutch C2 transmit are reduced by the fluctuation in the clutch torques, the engine speed Ne may be increased significantly. In this case, however, the engine torque Te is increased in such a manner that the engine speed Ne is maintained to the level higher than the synchronous engine speed corresponding to the previous lower gear stage in the amount of the slip speed of the clutches. In this case, therefore, the drive torque may also be adjusted to a target drive torque by suppressing slippages of the first clutch C1 and the second clutch C2. Thus, according to the embodiment, drop in the drive torque can be prevented during execution of the clutch-to-clutch upshifting.

When the hydraulic pressure applied to the first clutch C1 is reduced to a predetermined level such as zero at point t5, the controls of the engine torque Te and the torque transmitting capacity of the second clutch C2 based on the above-mentioned equations of motion are terminated, and the engine torque Te is maintained to the current level while increasing the torque transmitting capacity of the second clutch C2 (or the hydraulic pressure applied thereto) at the same rate as the previous increasing rate. For this reason, the torque transmitting capacity of the second clutch C2 can be increased sufficiently to prevent a drop in the drive torque and an occurrence of shocks even if the engine torque Te and the torque transmitting capacities of the clutches are fluctuated.

When the hydraulic pressure applied to the first clutch C1 is reduced to substantially zero and the hydraulic pressure applied to the second clutch C2 is increased sufficiently, the rotational speeds of the rotary members of the powertrain including the engine 1 start being changed at point t6 in accordance with a speed ratio of the gear stage to be established by the upshifting. In this situation, a commencement of the inertia phase is determined based on such change in the rotational speeds of the rotary members of the powertrain, and the hydraulic pressure applied to the second clutch C2 is maintained to the current level. Meanwhile, the engine torque Te is reduced during the inertia phase e.g., by carrying out an ignition retard. In addition, during the inertia phase, the drive torque is increased slightly from the target drive torque by a release of kinetic energy resulting from reduction in the rotational speeds of the rotary members. Then, when the engine speed Ne is reduced to a synchronous speed in the gear stage to be achieved by the upshifting, the upshifting is terminated at point t7, and the hydraulic pressure applied to the second clutch C2 is increased toward a line pressure established by the hydraulic control unit 10.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A shift control system for an automatic transmission that has a first frictional engagement device to be engaged to establish a predetermined low speed stage and a second frictional engagement device to be engaged to establish a predetermined high speed stage, that is connected to an output side of an engine, and that carries out an upshifting by disengaging the first frictional engagement device while engaging the second frictional engagement device during generation of torque by the engine, comprising:

a controller that controls the first frictional engagement device, the second frictional engagement device and the engine; and wherein the controller is configured to reduce a torque transmitting capacity of the first frictional engagement device at a predetermined rate while increasing a torque transmitting capacity of the second frictional engagement device with a reduction in the torque transmitting capacity of the first frictional engagement device, during execution of the upshifting, set a target speed of the engine to a level determined by adding a predetermined speed to a synchronous engine speed corresponding to the low speed stage, during a torque phase in which the torque transmitting capacity of the first frictional engagement device is being reduced and the torque transmitting capacity of the second frictional engagement device is being increased, execute a feedback control of an engine torque to maintain the engine speed to the target speed based on a difference between the target speed and an actual engine speed, and calculate the engine torque and the torque transmitting capacity of the second frictional engagement device using a first equation of motion determining a relation among an output shaft torque of the transmission, an input torque to the transmission, the torque transmitting capacity of the first frictional engagement device and the torque transmitting capacity of the second frictional engagement device, and a second equation of motion determining a relation among a change rate of an input speed to the transmission, the input torque to the transmission, the torque transmitting capacity of the first frictional engagement device and the torque transmitting capacity of the second frictional engagement device, while keeping the output shaft torque of the transmission to a constant value and setting the change rate of the input speed to the transmission to a value before execution of the upshifting, and wherein the feedback control includes a correction of the torque calculated using the first and second equations of motion.

2. The shift control system for an automatic vehicle transmission as claimed in claim 1, wherein the controller is further configured to maintain the engine torque to the current value and to increase the torque transmitting capacity of the second frictional engagement device at the same rate as a previous increasing rate, when the torque transmitting capacity of the first frictional engagement device is reduced to be lower than a predetermined level to be disengaged.

* * * * *